United States Patent [19]

Binns et al.

[11] 4,200,344

[45] Apr. 29, 1980

[54] MAGNETIC DISC STORES

[75] Inventors: Kenneth J. Binns, Chandler's Ford; Ronald W. Woolley, Poole, both of England

[73] Assignee: The University of Southampton, Southampton, England

[21] Appl. No.: 888,419

[22] Filed: Mar. 20, 1978

[30] Foreign Application Priority Data

Mar. 24, 1977 [GB] United Kingdom ............... 12365/77

[51] Int. Cl.² ......................... F16C 7/04; F16C 35/00
[52] U.S. Cl. ......................................... 308/9; 308/77; 308/134.1; 308/160; 308/172; 308/DIG. 1; 310/90
[58] Field of Search .................. 308/9, 10, 76–77, 308/134.1, 158–159, 172, DIG. 1, DIG. 15, 163, 169, 170, 160, 156; 310/90

[56] References Cited

U.S. PATENT DOCUMENTS

| | | | |
|---|---|---|---|
| 3,146,036 | 8/1964 | Benatti | 308/172 X |
| 3,302,048 | 1/1967 | Gray | 308/9 X |
| 4,043,612 | 8/1977 | Orcutt | 308/9 |

FOREIGN PATENT DOCUMENTS

1324147  7/1973  United Kingdom.
1359548  7/1974  United Kingdom.

*Primary Examiner*—Douglas C. Butler
*Attorney, Agent, or Firm*—Scrivener, Parker, Scrivener and Clarke

[57] ABSTRACT

Drive and support structure for magnetic disc stores comprising a drive spindle which is adapted for direct connection to a disc pack, a pair of self-acting air bearings which support the spindle with its axis vertical, and an alternating current synchronous motor comprising a rotor which is connected to the spindle between the bearings and carries permanent magnets, and a stator which surrounds the rotor and produces a rotating magnetic field which interacts with magnetic poles provided at the periphery of the stator by the magnets. The air bearings are each of the inward pumping zero flow herringbone type. The upper end of the spindle is adapted for connection to a disc pack, and the weight of the spindle is supported at its lower end through a self-acting fluid thrust bearing of the grooved hydrodynamic oil type. A cooling chamber is provided around the thrust bearing to cool recirculated oil.

12 Claims, 3 Drawing Figures

U.S. Patent
Apr. 29, 1980
4,200,344
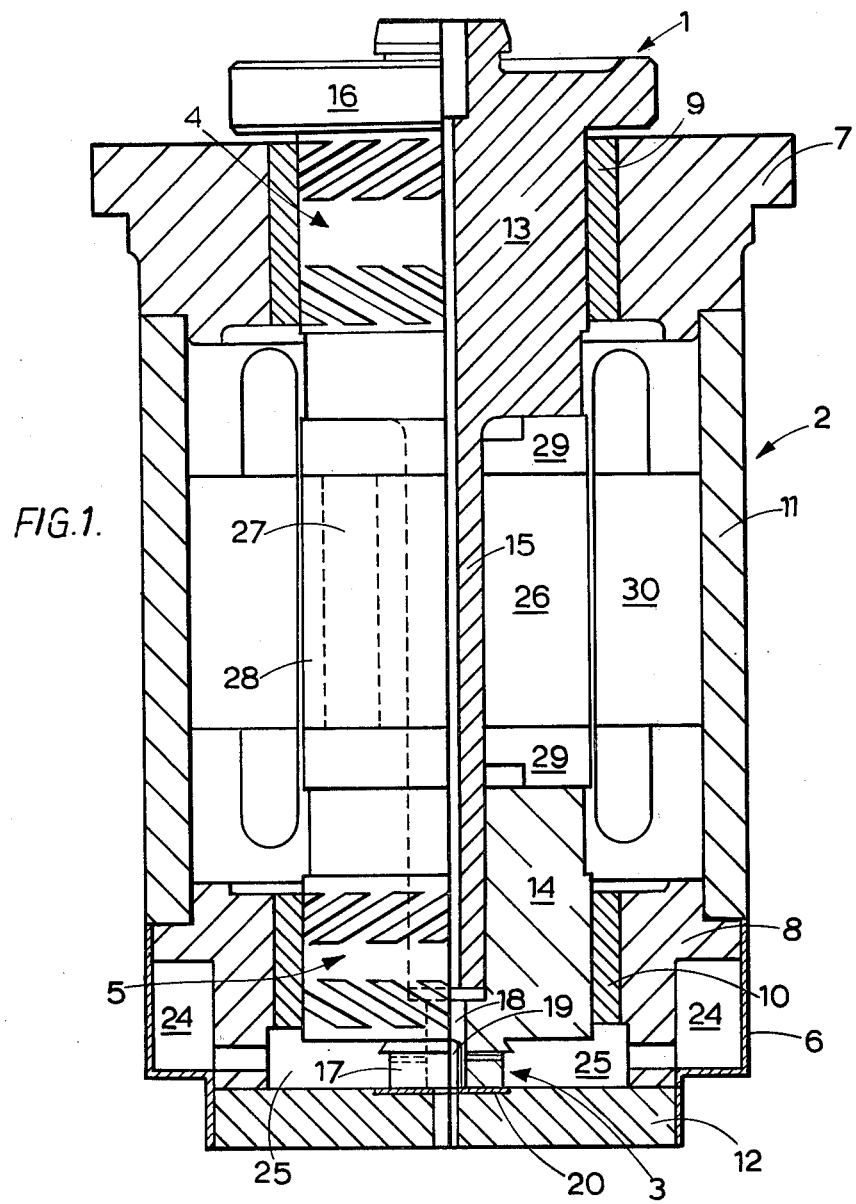
FIG.1.
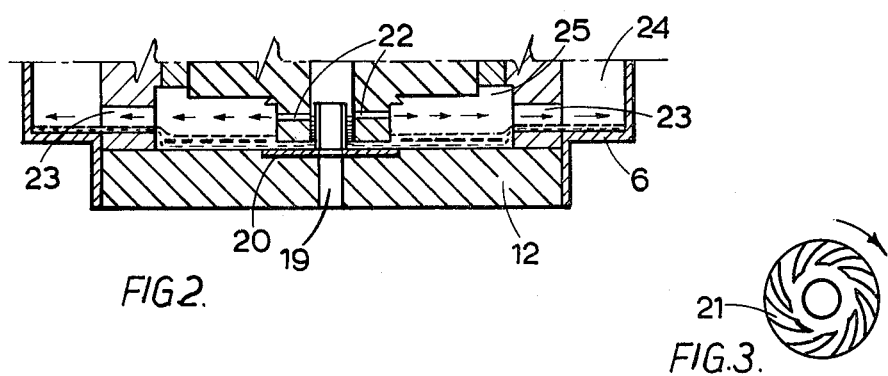
FIG.2.
FIG.3.

MAGNETIC DISC STORES

This invention relates to drive and support means for magnetic disc stores used for data storage in computers.

The storage capacity of any magnetic disc store is limited by the radial and axial accuracy of the positioning of the discs as they rotate, which is affected by random vibrations of the disc produced by shaft support and the drive means. The radial accuracy affects the number of tracks of concentric lines of data which can be stored on a disc, and the axial accuracy can affect the height at which the flying heads can operate to write information onto, and retrieve information from, the discs.

The storage capacity of a magnetic disc store is further limited by speed variations of the discs. Low frequency variations make it necessary for the amount of data which is stored on each of the concentric tracks to be determined according to the highest speed of the discs. Generally, therefore parts of the track are not used when the discs rotate at lower speeds. High frequency variations make it necessary, either to leave larger spaces between the individual bits written on each track so as to avoid overlap, or to write each bit over a longer length of the track, the result in both cases being to reduce the storage capacity.

Speed variations of the discs may make it necessary to provide synchronising information on the tracks to establish the position of the flying heads, and these blocks serve to further reduce the effective storage capacity of the discs.

Further, the access time for retrieval of information from the discs depends upon the speed of rotation of the discs, which, preferably, should be as high as possible without introducing undesirable speed variations which lead to uncertainty in the reading process.

The drive means for magnetic disc stores normally comprises a drive spindle to which a disk pack can be releasably connected and which is arranged so that it is supported by grease-filled ball bearings and is driven, through an overhung pulley and flat belt, by another pulley mounted on the output shaft of an induction or reluctance motor. This arrangement can limit the maximum positioning accuracy to 0.00003 inches. Further, relatively high belt tensions are often used to prevent slip or creep of the belt on the spindle pulley and to provide sufficient torque to accelerate the discs to operating speed. This tension in turn can cause metal to metal contact within the ball bearings which causes random vibrations of the discs.

An object of the present invention is to provide drive and support means for magnetic disc stores which, as compared with the known means, increases the storage capacity of any given disc pack through improved radial and axial accuracy in the movement of the discs, and improved constant speed drive characteristics.

This object is achieved by providing drive and support means comprising a drive spindle which is adapted for direct connection to a disc pack, a pair of self-acting air bearings which support the spindle with its axis vertical, and an alternating current synchronous motor comprising a rotor which is connected to the spindle between the bearings and carries permanent magnets, and a stator which surrounds the rotor and produces a rotating magnetic field which interacts with magnetic poles provided at the periphery of the stator by the magnets.

Mounting of the motor rotor directly on tne drive spindle leads to a total elimination of the high radial forces produced by the belt drive connection in the known drive and support means. Also, the vertical orientation of the spindle and the use of air bearings further reduces any radial loads on the spindle. Only unbalanced magnetic forces in the motor and dynamic unbalanced forces produced by the disc pack itself, are exerted radially on the spindle, and both of these forces can be kept low (2/lbs or less) by an appropriate choice of manufacturing tolerances and by suitable dynamic balancing. The resulting low radial loading of the spindle combined with a total lack of metal to metal contact in the bearings leads to extremely low vibration and noise level in operation.

The air bearings are preferably of the inward pumping, zero flow, herringbone groove type. When operating at the required design speed, the averaging effect of the air film serves to produce a radial running accuracy ten or twenty times greater than the geometrical tolerance errors in the bearing surfaces either side of the air film. The low and stable co-efficient of viscosity of air allows a relatively large diameter spindle to be used, at least in the region of the bearings, to generate an acceptable radial bearing stiffness at a very low power consumption.

An alternating current synchronous motor incorporating permanent magnet excitation in the rotor, is preferred to any other motor because it avoids heating of the spindle by rotor currents, such heating being undesirable because it can cause distortion of the spindle and a reduction in its accuracy of movement. Also, this type of motor can be made to run at an absolutely constant synchronous speed and at higher speeds (typically 3000 to 3600 r.p.m.) than those obtained within the known drive means. Preferably, the motor is one as claimed or disclosed in British Pat. Nos. 1,324,147 and 1,359,548.

The spindle is supported vertically by a thrust bearing which is preferably a fluid bearing so as to reduce the axial effect of manufacturing inaccuracies and to eliminate vibration and noise. Typically, the spindle and a disc pack of eleven discs weighs about 50 lbs. If a grooved self-acting air thrust bearing were used to support this load at a reasonable lift-off height (typically, 0.0005 inches), a relatively large (7 inch) diameter bearing would be needed. Further, metal to metal rubbing on starting and stopping could encourage galling and eventual seizure of the bearing surfaces. Preferably, therefore, a grooved hydro-dynamic oil bearing of the inward pumping, recirculating type is used. Due to the higher viscosity of oil, a smaller (1.5 inch) diameter bearing may be used which has similar load carrying capability and lift-off characteristics to said air thrust bearing. As a result, not only is the seizure problem reduced but, due to its significantly smaller size, the thrust bearing costs less to manufacture.

The invention will now be described by way of example with reference to the accompanying drawings in which:

FIG. 1 shows drive and support means according to the invention, half in side elevation and half in axial section, FIG. 2 is a sectional view of the lower end of the drive and support means of FIG. 1 when operating, showing the action of the hydraulic thrust bearing, and FIG. 3 is an axial view of the lower end of the thrust bearing in FIG. 2.

The illustrated drive and support means comprises a spindle 1 which is rotatably supported with it axis vertical in an outer fixed support housing 2, the weight of the spindle being supported through a fluid thrust bearing 3 at its lower end, and lateral movement of the spindle being restrained by two self-acting air bearings 4 and 5 at its upper and lower ends.

The support housing 2 comprises upper and lower support rings 7 and 8 into each of which a bearing liner 9 and 10 is either heat shrunk or resin bonded, a tubular member 11 connecting the two support rings, a lower support disc 12 connected to the lower support ring 8 and carrying part of the thrust bearing 3, and an annular cooling chamber wall 6 which surrounds the thrust bearing 3 and air bearing 5.

The spindle 1 is of composite construction and comprises upper and lower bearing portions 13 and 14 which are each a close fit in the respective bearing liners 9 and 10. The upper bearing portion 13 is formed with a downwardly projecting spigot 15 of reduced diameter by which it is connected to the lower bearing portion 14 through a shrink fit. The upper end of the upper bearing portion 13 is also formed with an integral connector 16 of conventional form by which the spindle can be releasably connected to the disc pack of a magnetic disc store.

The air bearings 4 and 5 are of the inward pumping, zero flow, herringbone groove type, typically having an air film clearance of 0.0003 to 0.0004 inches. The herringbone groove pattern is formed on the two bearing portions of the spindle for example, by etching or abrasive grinding. The groove parameters of this type of bearing vary according to the operational requirements, but in the illustrated case, the groove pattern is typically 0.0005 inches deep.

The thrust bearing 3 is a grooved hydro-dynamic oil bearing of the inward pumping, recirculating type. The thrust runner 17 is formed integrally at the lower end of the lower bearing portion 14 and is formed with a central bore 18 which loosely receives an upstanding pin 19 connected to the support disc 12. A disc 20 of sintered bronze containing a mixture of P.T.F.E. and lead is set into the surface of the support disc 5 opposite the thrust runner to provide a hard wearing low friction surface. As shown in FIG. 3, the lower face of the thrust runner 17 is formed with a series of arcuate grooves 21 which are shaped so that they pump oil inwards into the bore 18 when the spindle rotates in the direction of the arrow. The oil is then thrown outwards by centrifugal action through a series of radially directed holes 22 in the thrust runner 17, as shown in FIG. 2. This oil passes through a series of holes 23 in the lower support ring 8, into the cooling chamber 24 between the ring and the outer wall 9, and flows back through these same holes 23 into the reservoir 25 to be recirculated by the thrust runner.

The spindle 1 is driven by an alternating current synchronous motor comprising a rotor 26 which is shrunk onto the spigot 15 and carries permanent magnets 27 and a squirrel-cage 28 with end rings 29, and a stator 30 which is a good location fit inside the tubular support member 9 and is wound in the conventional manner of an induction motor stator so as to produce a rotating magnetic field.

Preferably, the motor is one of those disclosed in British Pat. Nos. 1,324,147 and 1,359,548.

British Pat. No. 1,324,147 proposes the use of a permanent magnet rotor suitable for an alternating current synchronous motor comprising a generally cylindrical body having a number of uniformly circumferentially spaced slots extending inwards from their outer peripheries to define pole-pieces between them, and permanent magnets which are located in the slots and provide localised poles at the periphery of the rotor which poles direct flux outwards in a generally radial direction and are arranged in pairs of similar polarity one on each side of a pole-piece, with the pairs of localised poles at the sides of adjacent pole-pieces being of opposite polarity.

In use in a motor the localised poles provided by the magnets at the sides of the slots interact with the rotating magnetic field of a surrounding stator and result in forces which tend to make the magnets follow the field. At the same time the pole-pieces between the slots attempt to align themselves with the rotating magnetic field in positions of minimum reluctance and as a result the pole-pieces tend to rotate with the field. Thus, the rotor rotates under the effect of two actions, the one being the permanent magnet motor action of the localised poles and the other the reluctance motor action of the pole-pieces. It is the combined action of these two effects which improves the ability of the motor to start against a high inertia load as compared with pure reluctance or permanent magnet motors.

In the illustrated rotors of this first patent, the magnets received in the slots are oriented so that their poles form the said localised poles at the periphery of the rotor. For example, in one rotor there are two magnets in each slot, each having its magnetic axis extending in a generally radial direction, the magnets being at opposite sides of the slot and being of opposite polarities, but the arrangement being such that each pole-piece is flanked by two magnets of like polarity. In another rotor, instead of two magnets there is only one in each slot, but this magnet is magnetised so that its two poles are at circumferentially spaced points at its outer surface, i.e. at the outside of the rotor, so as to direct the flux outwards. For example, the single magnet is of horseshoe shape with its bight innermost and its limbs directed outwards, or is in the form of a simple rectangular or segmental block, but with its magnetisation made to be such that the main regions of emergence of the flux are at circumferentially spaced points at its outer face rather than at its two circumferentially spaced ends, i.e. the ends that engage the sides of the adjacent pole-pieces.

Instead of orientating the magnets in the slots so that their poles lie at the periphery of the rotor, British Pat. No. 1,359,548 proposes to use magnets having their magnetic axes arranged tangentially. According to the invention, each slot contains a magnet tangentially of the rotor axis, and a pair of magnetic shoes arranged one adjacent each pole of the magnet at the side of the slot and both shoes being at least partially magnetically isolated from the pole-pieces so that a corresponding localised magnetic pole is induced in each shoe over a restricted peripheral region of the rotor, which induced pole directs flux outwards in a generally radial direction.

For example, there may be one magnet in each slot with its magnetic axis extending tangentially of the rotor and with a magnetic shoe adjacent each pole extending radially of the rotor. The magnetic shoes may be formed separately from the rotor or may be formed by portions of the rotor body at the sides of the slots, which portions are partially magnetically isolated from the rest of the rotor body by slots formed therein. Magnetic isolation of the shoes from the rotor body reduces the quadrature axis permeance of the rotor which contributes to improved performance of the rotor.

Preferably the rotor incorporates a squirrel cage in a manner known in itself, to provide the starting torque by an induction motor action.

Care is taken to ensure that the spindle 1 and support housing 2 are concentric, by providing a precision fit between the bearing support rings 7 and 8 and the tubular member 11 so that the stator 30 and bearing liners are co-axial. Further, the bearing portions 4 and 5, the lower surface of the thrust runner 17 and the outer surface of the rotor 26 are machine finished simultaneously, e.g. by cylindrical grinding.

Also, care is taken to ensure that the upper surface of the lower support disc 5 and the lower surface of the thrust runner 17 are truly parallel, by grinding the former flat and machining the lower edge of the support ring 8 square relative to the axis of the support housing.

We claim:

1. Drive and support means for magnetic disc stores comprising a drive spindle which is adapted for direct connection to a disc pack, a pair of self-acting air bearings which support the spindle with its axis vertical, an alternating current synchronous motor comprising a rotor which is connected to the spindle between the bearings and carries permanent magnets, and a stator which surrounds the rotor and produces a rotating magnetic field which interacts with magnetic poles provided at the periphery of the stator by the magnets, means at the upper end of said spindle for connecting said spindle to a disc pack, and a self-acting fluid thrust bearing at the lower end of said spindle for supporting the weight of said spindle.

2. Means as claimed in claim 1 in which each of the air bearings is an inward pumping zero flow type.

3. Means as claimed in claim 2 in which each air bearing comprises a herringbone pattern of grooves which rotate with the spindle and pump air inwards along the grooves.

4. Means are claimed in claim 2 in which the spindle is supported in an outer housing comprising upper and lower bearing support rings which each incorporate fixed parts of a respective air bearing, and a tubular member which connects the two support rings and supports the stator within it.

5. Means as claimed in claim 2 in which the rotor comprises a generally cylindrical body having a number of circumferentially spaced slots extending inwards from their outer peripheries to define pole-pieces between them, and permanent magnets being located in the slots and providing localised poles at the periphery of the rotor which poles direct flux outwards in a generally radial direction and are arranged in pairs of similar polarity one on each side of a pole-piece, with the pairs of localised poles at the sides of adjacent pole-pieces being of opposite polarity.

6. Means as claimed in claim 1 in which the spindle is of composite construction and comprises upper and lower portions, each of which carries part of a respective one of the air bearings, and which are connected together by an axially extending integral spigot on one portion which engages the other portion and carries the rotor.

7. Means as claimed in claim 6 in which said other portion and rotor are shrunk onto the spigot.

8. Means as claimed in claim 1 in which the thrust bearing is a grooved hydro-dynamic oil bearing.

9. Means as claimed in claim 1 in which the rotor comprises a generally cylindrical body having a number of uniformly circumferentially spaced slots extending inwards from their outer peripheries to define pole-pieces between them and receiving said permanent magnets, each slot containing a magnet having its magnetic axis extending substantially tangentially of the rotor axis, and a pair of magnetic shoes arranged one adjacent each pole of the magnet at the side of the slot and both shoes being at least partially magnetically isolated from the pole-pieces so that a corresponding localised magnetic pole is induced in each shoe over a restricted peripheral region of the rotor which induced pole directs flux outwards in a generally radial direction.

10. Drive and support means for magnetic disc stores comprising a drive spindle having an upper end and a lower end, said upper end being adapted for direct connection to a disc pack, a pair of self-acting air bearings which support the spindle with its axis vertical, an alternating current synchronous motor comprising a rotor which is connected to the spindle between the bearings and carries permanent magnets, and a stator which surrounds the rotor and produces a rotating magnetic field which interacts with magnetic poles provided at the periphery of the stator by the magnets, and a self-acting grooved hydrodynamic oil thrust bearing supporting said lower end of said spindle, said thrust bearing comprising a thrust runner which is formed integrally on the lower end of the spindle and is formed with a grooved lower thrust face and a central bore and radially directed passages communicating with said bore through which recirculated oil is thrown by centrifugal action.

11. Means as claimed in claim 10 in which a cooling chamber is provided around the thrust runner to cool the recirculated oil.

12. Means as claimed in claim 11 in which the lower air bearing comprises a fixed bearing ring which surrounds the spindle, and in which a thrust bearing support disc is connected to the lower side of the bearing ring for engagement with the thrust runner so as to define an oil reservoir, and an annular cooling member is connected around the bearing ring to define the cooling chamber, apertures being provided in the bearing ring to allow oil thrown radially from the thrust runner to enter the cooling chamber and to flow back into the reservoir.

* * * * *